J. S. CORBIN.
Wheel-Harrow.

No. 8,765. Reissued June 24, 1879.

Witnesses:
H. N. Low.
J. S. Barker.

Inventor:
Jay S Corbin
by H A Doubleday atty

THE NORRIS PETERS CO., PHOTO-LITHO., WASHINGTON, D. C.

UNITED STATES PATENT OFFICE.

JAY S. CORBIN, OF GOUVERNEUR, NEW YORK.

IMPROVEMENT IN WHEEL-HARROWS.

Specification forming part of Letters Patent No. 197,545, dated November 27, 1877; Reissue No. 8,765, dated June 24, 1879; application filed May 26, 1879.

*To all whom it may concern:*

Be it known that I, JAY S. CORBIN, of Gouverneur, in the county of St. Lawrence and State of New York, have invented certain new and useful Improvements in Wheel-Harrows; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
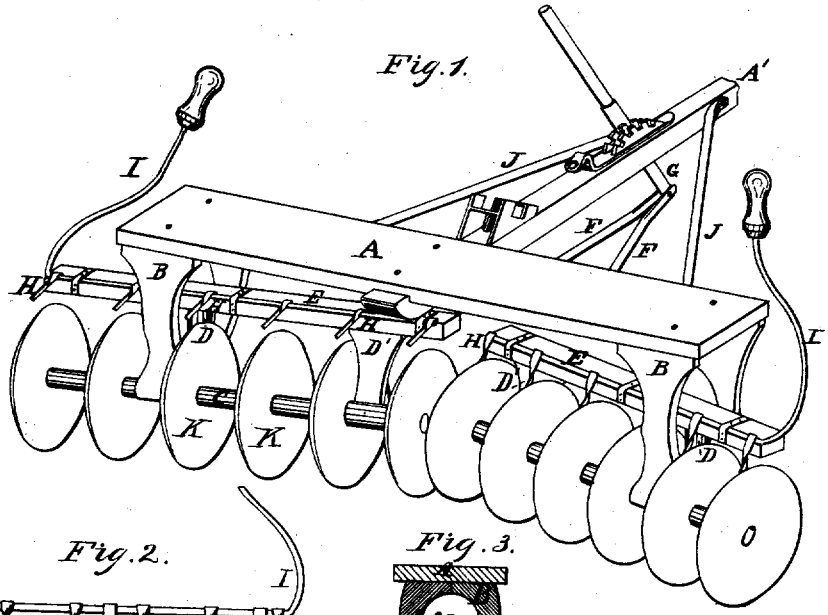
Figure 2:
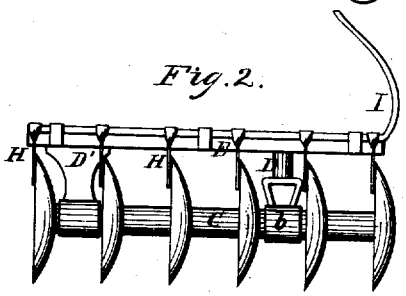
Figure 3:
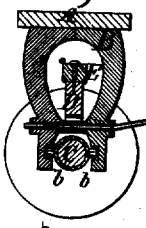
Figure 5:
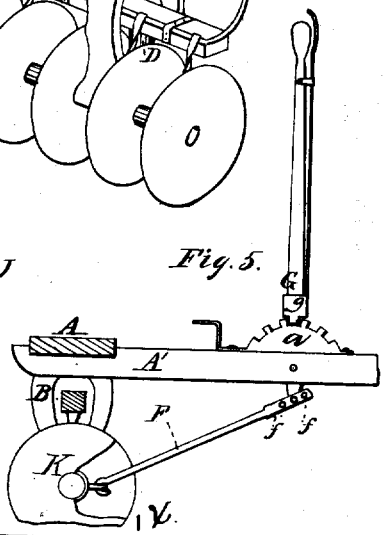
Figure 4:
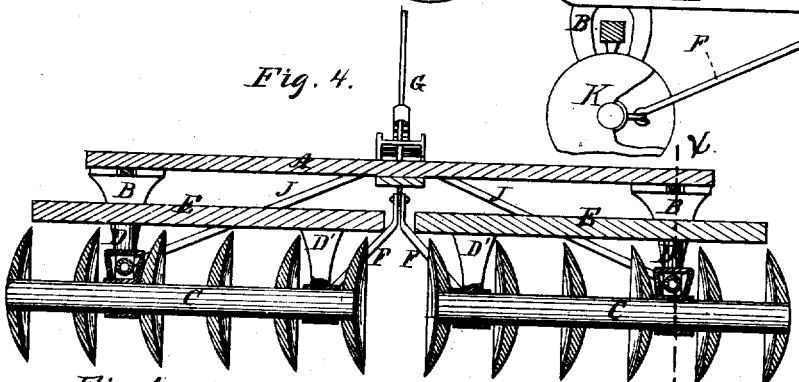
Figure 6:
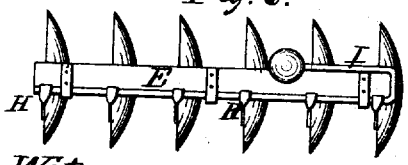
Figure 7:
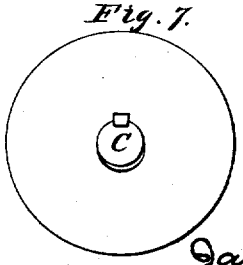

Figure 1 is a perspective view. Fig. 2 is a rear elevation of one gang. Fig. 3 is a sectional view through the line *x y* of one hanger, its adjustable thimble-bearing, and its stay-brace. Fig. 4 is a longitudinal vertical section, showing each half of one hanger, its thimble-bearing, and standard for supporting the scraper-bar. Fig. 5 is a side elevation of the setting-lever, with its dog, rack, and connecting-rods. Fig. 6 is a plan view of one gang removed from the main frame, and showing the scraper-beam and scraper-shaft; and Fig. 7 shows one disk with irregular central hole and its tapering key.

Similar letters of reference denote corresponding parts in all the figures.

My invention relates to the improvement of that class of machinery known as "wheel" or "disk" harrows, in which the disks are arranged in two or more gangs upon horizontal rotating shafts; and has for its object the construction of the machine in such manner as to adapt the gangs to follow the uneven surface of the ground; also, to provide for the easy and rapid setting of the gangs at any desired angle to the line of draft while in motion or at rest, and holding the same when set; also, to provide a series of adjustable cleaners or scrapers attached to a common shaft, which shaft is supported in a different vertical plane from that of the disk-shaft, and made adjustable in numbers corresponding with the number of disks in the gangs, and controlled by the driver in his seat while the machine is in motion, for the purpose of cleaning the disks; also, to relieve the gangs largely from the effects of the endwise thrust produced by drawing the disks through the soil angularly; also, to the construction of the frame, whereby the hangers are rigidly supported and the main plank relieved from undue twisting-strain; also, to provide a ready means of setting the gangs at different angles relative to the line of draft, whereby the tendency of the two inner wheels of each gang to become clogged is lessened; also, to provide means for attaching the disks to their axles.

In the accompanying drawings, A represents the main-frame plank, with tongue A′ rigidly attached at right angles thereto. B B are hangers firmly bolted to the main plank, and projecting downward sufficiently to receive the trunnions of the thimble-bearings *b b*, which latter are loosely placed in sockets formed in the lower end of the hangers, so as to permit the gangs to be set at an angle to the line of draft, and also to allow the gangs to rock sufficiently to fit uneven surfaces.

I prefer to make each hanger in two parts, as shown in Fig. 4.

The socket in the front half of the hanger is oval in shape, to allow one trunnion to slide horizontally in setting the gangs at an angle. The rear socket is circular, and but slightly larger than the trunnion fitting into it. By these means I obtain a universal motion to the gangs and large wearing-surfaces for the gang-shafts.

Braces J J are carried from near the lower end of the hangers to the tongue.

D D′ are standards erected upon thimbles, which are placed upon the gang-axles for the purpose of supporting the scraper-beams E E. I prefer to erect one of these standards upon the thimble held by the hanger B, for convenience. The upper end of standard D′ is carried forward, so as to hold the scraper-beam in a different vertical plane from the gang-axle. This is done to enable the scrapers to pass the rims of the disks K, and press the concave sides thereof sufficiently close to remove any adhering earth, roots, &c., from the disks.

The connecting-rods F F connect the lower ends of the standards D D′ with the lower end of the set-lever G, as shown in Fig. 5. The set-lever is pivoted to the tongue a short distance in advance of the gangs, and also of the driver's seat. It is furnished with a dog, *g*, working in a segmental rack, *a*, to hold the lever rigidly wherever set. Its connection with the gangs is such that when its upper end is carried forward to its limit the gangs will be in a straight line for removal to and from the field. When the lever is set perpendicularly the gangs are correct for pulverizing soft soil. When at its backward limit it is correct for the harder clay soil.

The scrapers H H, I attach firmly to shafts, which are so hung upon the scraper-beams E as to permit about one-fourth of a revolution by means of the levers I I.

By these levers the scrapers may be removed from the disks sufficiently to prevent their becoming clogged with roots, grass, &c.

In implements of this class the drawing of the disks angularly through the soil has a tendency to lift the outer and depress the inner end of the gang. I overcome this tendency by placing the thimble-bearings at the gang-axle instead of above it, and by placing the connecting-rods F F at an inclination, so that they draw upward somewhat, and this upward lift is increased the more the inner end of the gang is depressed.

The connecting-rods F F are provided with a series of holes, *f*, at their forward ends, to allow one gang to be set at a different angle from the other, so that, if desired, the two inner disks may not fall opposite each other exactly, in which position they are more liable to become clogged than if one is slightly in advance of the other.

In order to attach the disks securely I make an irregular hole through the bosses of any suitable shape, so that only two points in the inside of the hole rest upon the axle. These points are one-third the circumference of the axle apart. At the same distance from each of these points I place a keyway, into which I firmly drive a tapering wedge. By this means I secure three bearing-surfaces for each disk, which permit their ready removal when broken.

What I claim is—

1. The combination, with the main frame, of hangers rigidly connected thereto, and independent disk-gangs vibrating upon the hangers, substantially as set forth.

2. The combination, with the main frame, of hangers B B, rigidly attached thereto, and independent disk-gangs pivoted at the lower ends of said hangers and vibrating in both horizontal and vertical planes, substantially as set forth.

3. In combination with the main frame and the disk-gangs, the hangers B B, provided with the enlarged pivot bearings or seats, and the thimble-bearings *b b*, provided with pivots, which are supported in said seats, substantially as set forth.

4. The combination, with a gang of rotating harrow-disks, of a revolving scraper-bar, placed in a different plane from the disk-shaft to permit the scrapers to enter the concave side of the disks, substantially as described.

5. The combination, in a wheel-harrow, of the following elements, viz: a draft-frame or a draft-plank projecting laterally from the tongue, disk-gangs pivoted to the draft-frame or draft-plank, and a set-lever mounted on the tongue and connected with the disk-gangs between the points at which said gangs are connected with the draft-frame or draft-plank, substantially as set forth.

6. The combination, substantially as set forth, in a wheel-harrow, of the following elements, viz: a tongue, a draft-frame or draft-plank projecting laterally from the tongue, disk-gangs pivoted to the draft-frame or draft-plank, a lever mounted on the tongue, and rods connected with the levers and the metal bearings which support the inner ends of the disk-gangs.

7. The combination, substantially as set forth, in a wheel-harrow, of the following elements, viz: a tongue, a draft-plank or draft-frame projecting laterally from the tongue, disk-gangs pivoted to the draft plank or frame, a lever mounted on the tongue connected with the inner end of the disk-gangs, and a rack and dog for holding the disks in proper position when set.

8. The combination, substantially as set forth, in a wheel-harrow, of the following elements, viz: a tongue, a frame-plank or draft-plank projecting laterally from the tongue, disk-gangs pivoted to the draft frame or plank, a lever connected with the disk-gangs, for setting them at the desired angle to the draft-plank, and levers and scrapers supported upon and adjusted with the disk-gangs.

9. In a wheel-harrow, the disks attached to an axle by means of an irregular hole through the center of the disk, which permits it to touch the axle in but two points, and a tapering wedge, the two points and the wedge being equidistant, substantially as set forth.

10. The combination, in a wheel-harrow, of independent disk-gangs, a lever, G, and connecting-rods F F, one or both rods being provided with holes *f*, whereby the inner end of one disk-gang may be arranged in advance of the inner end of the other disk-gang, substantially as set forth.

11. The combination, in a wheel-harrow, of the main frame A, hangers B B, thimbles *b b*, connecting-rods F F, lever G, and scrapers H H, substantially as described.

In testimony that I claim the foregoing I have hereunto set my hand.

JAY S. CORBIN.

Witnesses:

A. G. HILL,
S. L. GIBSON.